(12) United States Patent
Curreno

(10) Patent No.: US 6,309,133 B1
(45) Date of Patent: Oct. 30, 2001

(54) PROCESS FOR FIXING A GUIDING MEMBER ON A SUPPORT, GUIDING DEVICE OBTAINED BY THIS PROCESS AND MARKING APPARATUS INCORPORATING SUCH A DEVICE

(76) Inventor: Marie-Christine Curreno, 4, rue du Lieutenant Vittoz, Rillieux (FR), 69140

( * ) Notice: Subject to any disclaimer, the term of this patent is extended or adjusted under 35 U.S.C. 154(b) by 0 days.

(21) Appl. No.: 09/182,496

(22) Filed: Oct. 30, 1998

(30) Foreign Application Priority Data

Nov. 5, 1997 (FR) .................................................. 97 14180

(51) Int. Cl.$^7$ ...................................................... F16B 11/00
(52) U.S. Cl. .......................... 403/267; 403/152; 403/154; 403/163
(58) Field of Search .................................... 403/150, 151, 403/152, 154, 155, 157, 161, 163

(56) References Cited

U.S. PATENT DOCUMENTS

| 4,263,832 | * | 4/1981 | Lang et al. . |
|---|---|---|---|
| 4,620,814 | | 11/1986 | May . |
| 5,002,411 | * | 3/1991 | Therond . |
| 5,249,898 | * | 10/1993 | Stepanski et al. . |
| 5,368,400 | * | 11/1994 | Cyphert et al. .................. 400/124.01 |

FOREIGN PATENT DOCUMENTS

| 35 19679 | * | 4/1986 | (DE) . |
| 2109232 | * | 5/1972 | (FR) . |

* cited by examiner

*Primary Examiner*—Lynne H. Browne
*Assistant Examiner*—Tomlyne Malcolm
(74) *Attorney, Agent, or Firm*—Dowell & Dowell, P.C.

(57) ABSTRACT

A process for securing a guiding member on a support which includes at least one opening which is substantially greater in dimension than an end of the guiding member which is supported therein. A space provided between the at least one opening and the end of the guiding member is filled with a polymerizable resin which is polymerized to secure the guide member within the opening after the guiding member has been precisely positioned in a predetermined position. A marking apparatus incorporates the guiding member secured to the support, and elements are provided for retaining the guiding member in position within the at least one opening and, in some embodiments, for selectively adjusting or removing the guide bar from the at least one opening.

18 Claims, 4 Drawing Sheets

PROCESS FOR FIXING A GUIDING MEMBER ON A SUPPORT, GUIDING DEVICE OBTAINED BY THIS PROCESS AND MARKING APPARATUS INCORPORATING SUCH A DEVICE

BACKGROUND OF THE INVENTION

1. Field of the Invention

The present invention relates to a process for fixing a guiding member on a support.

2. Brief Description of the Related Art

It is necessary to position each guiding member with respect to the bearing surfaces which receive it, in extremely meticulous manner. To that end, it is known to machine said bearing surfaces to precise dimensions with respect to a reference surface of the support, so as to produce openings in which the guiding members are introduced with reduced clearance.

However, such a process has certain drawbacks. In effect, it involves an extremely meticulous machining, which leads to long manufacturing time and high costs.

Moreover, in the case of apparatus with low mechanical strength, such as marking apparatus, the quality of geometry hoped for is not always obtained once the assembly is effected. In effect, the marking apparatus is capable of being deformed under the effect of the stresses exerted by the flanging occurring during the corresponding machining, or under the influence of the cutting efforts of the tools used for such machining.

In order to overcome the drawbacks of the prior art set forth hereinabove, the invention has for its object a process for fixing a guiding member on a support which ensures a precise positioning of these different elements with respect to one another, while generating limited mechanical efforts.

SUMMARY OF THE INVENTION

To that end, the invention relates to a process for fixing a guiding member on a support, in which at least one opening adapted to receive an end of the guiding member, is made in the support, and this end is introduced in the opening. The opening is made with transverse dimensions substantially greater than those of the end which is received therein. The guiding member is placed in the precise position that it must occupy, an intermediary space is thus defined between the outer periphery of the end and the opposite walls of the opening, which intermediary space is filled with a polymerizable resin and said resin is polymerized so as to secure the end with respect to the opening.

The process according to the invention enables the objects set forth above to be attained.

In effect, being given that each opening is made with transverse dimensions clearly greater than those of the end of the guiding member which is received therein, the corresponding machining requires no particular precision. It may therefore be effected much more rapidly than that employed in the prior art processes, and does not involve flanging of the different elements.

The phase of relative positioning of the guiding member and of the opening in which the latter is inserted, may be carried out by simple mechanical means, for example a system of wedging. This therefore does not induce considerable efforts that may alter the geometry of the apparatus once produced.

Finally, the polymerizable resin introduced within the intermediary space made between the guiding member and the opening which receives it, ensures a reliable fixation of each guiding member on the support.

The invention also relates to a guiding device obtained according to the above process, comprising at least one guiding member fixed on a support, each end of this member being housed in a corresponding opening made in the support. The opening has transverse dimensions substantially greater than those of the end of the guiding member, and a liner is formed by a polymerizable resin in the solid state being cast in situ between the outer periphery of this end and the opposite walls of the opening.

The guiding device may comprises one or more of the following characteristics:

- the guiding member may slide axially with respect to the liner and, in the vicinity of each end of the guiding member, there are provided removable means for axially immobilizing this end with respect to the support;
- the removable immobilizing means comprise at least one fixing element screwed in a wall of the support in the vicinity of the opening, a part of said element projecting at the opening so as to retain the end of the guiding member in abutment;
- the end of the guiding member comprises a shoulder, the removable immobilization means comprising a pocket of resin, disposed in the vicinity of the shoulder;
- the outer periphery of the ends of the guiding member is surrounded by means of a possibly bevelled ring;
- an anti-adhesive coating is disposed on the outer periphery of the ends of the guiding member; and
- the ends of the guiding member are connected by a median part of smaller section.

Finally, the invention relates to a marking apparatus comprising at least one guiding device as described hereinabove.

BRIEF DESCRIPTION OF THE DRAWINGS

The invention will be more readily understood on reading the following description given by way of non-limiting example, with reference to the accompanying drawings, in which.

DESCRIPTION OF PREFERRED EMBODIMENTS

Figure 1:
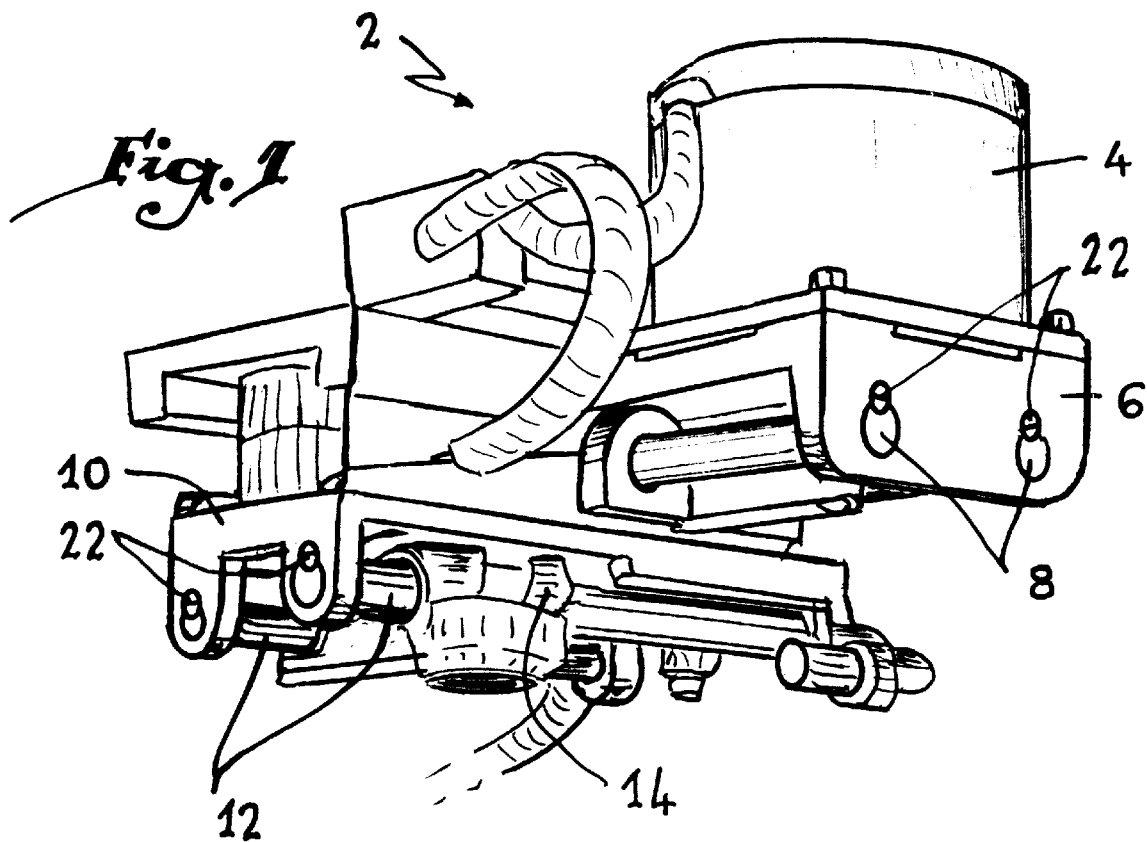
FIG. 1 is a schematic view in perspective of a marking apparatus according to the invention.

Referring now to the drawings, the marking apparatus shown in FIG. 1 is generally designated by reference 2 and comprises, in manner known per se, a fixed frame 4 comprising two opposite flanges 6 supporting two bars 8 constituting guiding members, with a view to displacing a first carriage 10 along the axis of these bars. Said carriage is also provided with two guiding bars 12, the two pairs of bars 8, 12 being disposed substantially at right angles.

Bars 12 ensure guiding of a second carriage 14 on which a marking head (not shown) is intended to be mounted. The two carriages 10, 14 therefore constitute the drive mechanism of the marking apparatus, and ensure the positioning of the marking head in two directions orthogonal to each other. The respective drive of the two carriages 10, 14 is ensured, in manner known per se, via electric motors (not shown).

The fixing of each bar on its respective support will be described hereinafter with reference to FIGS. 2 to 9, in which reference will solely be made to the fixation of the bars 8 on the flanges 6 of the frame 4. Fixation of bars 12 on the first carriage 10 is, of course, similar.

Figure 2:
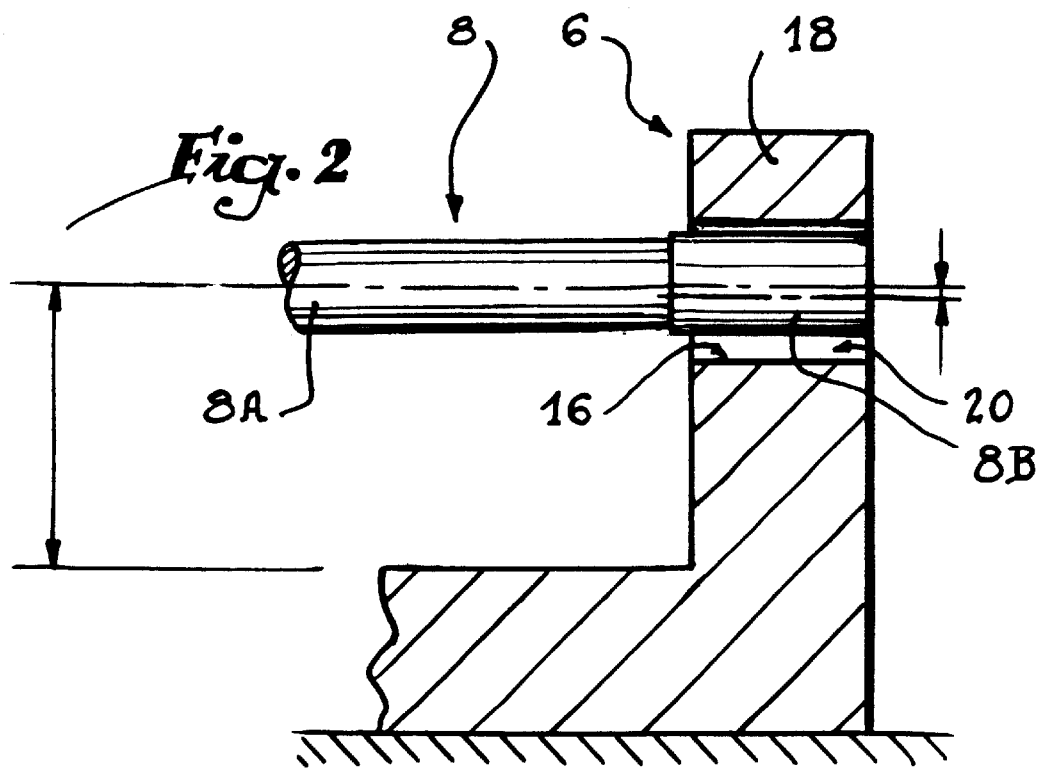
FIG. 2 is a schematic view in section illustrating the phase of positioning a guiding member of the marking apparatus of FIG. 1.

As shown in FIG. 2, each bar 8 comprises a cylindrical median part 8A terminating in two cylindrical ends 8B of larger diameter, of which only one has been shown. Bar 8 is intended to be fixed on the flange 6 by its ends 8B. Each of the latter is received at a cylindrical through opening 16 made in the flange 6. This opening 16 has a transverse dimension, namely a diameter D, which is substantially greater than that of the end 8B, namely its diameter d.

With a view to fixing the bar 8 on the flange 6, each end 8B should firstly be introduced inside the opening 16, then positioned relatively in accordance with the conformation that the marking device once produced must present. To that end, the bar 8 is maintained with respect to a reference surface of the frame 4, in the present case a previously precision-ground base 6A, at appropriate distances and configurations. Such maintenance may be ensured, for example, by a system of wedges. It should be noted that, in the example shown, the bar 8 and the opening 16 are not strictly coaxial.

Being given that the respective diameters of the end 8B of the bar 8 and of the opening 16 are substantially different, the outer periphery of the end 8B defines, with the opposite walls of the opening 16, an approximately annular intermediary space 20. While maintaining the bar 8 and the flange 6 in their relative positions set forth above, this intermediary space 20 is then filled by means of a polymerizable resin, for example an epoxy or polyurethane resin. It may also be provided to use other types of equivalent hardenable materials.

This resin is then polymerized in manner known per se. Once this polymerization is finished, the solidified resin filling the intermediary space 20 forms a liner within which the end 8B of the bar is held. Consequently, the bar 8 and the flange 6 are perfectly secured with respect to each other, in accordance with the dimensions and orientations corresponding to the shown arrangement of the marking device. It is then possible to remove the wedging system having contributed to the relative hold of the bar and the carriage during the resin polymerizing time.

Figure 3:
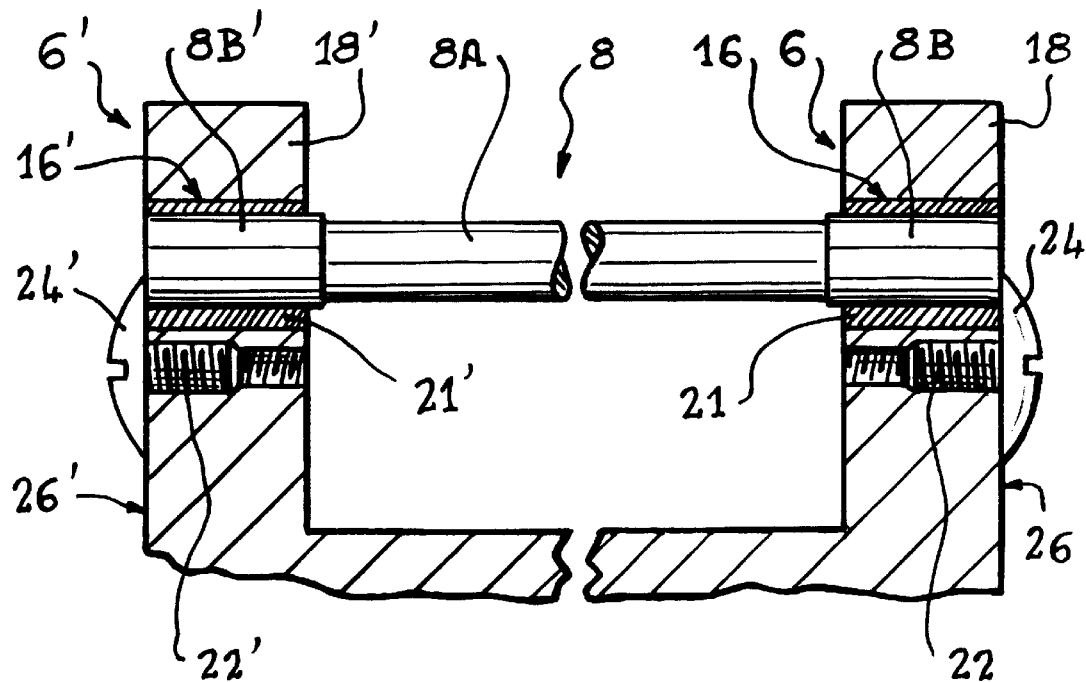
FIGS. 3 and 4 are schematic views in section illustrating a first variant embodiment, in two phases of assembly of a guiding member.
Figure 4:
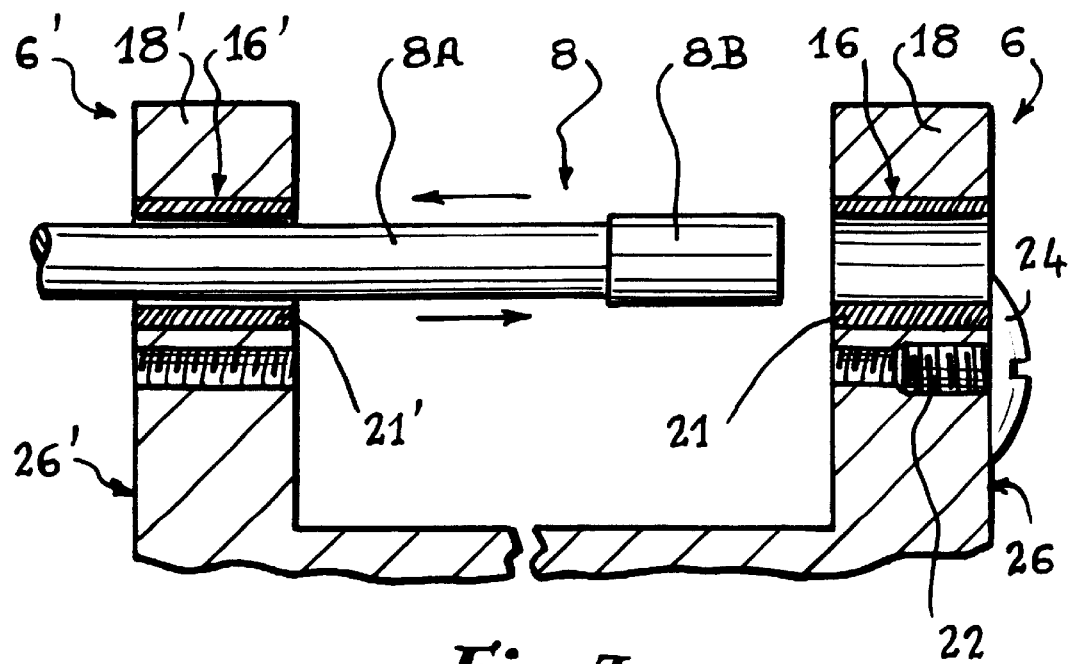

FIGS. 3 and 4 illustrate a first variant embodiment of the invention. The bar 8 which is mounted in two openings 16, 16' made in the flanges 6, 6' opposite the frame 4, is similar to the one shown in FIG. 2. However, the outer periphery of the ends 8B of this bar 8 is coated with an anti-adhesive varnish which allows them to slide freely in the liners 21, 21' of resin filling the intermediary spaces designated by reference 20 in FIG. 2.

Two screws 22, 22' are engaged in each flange 6, 6'. Their head 24, 24' is disposed against the outer face 26, 26' of each flange 6, 6' and extends in the vicinity of each opening 16, 16', with the result that each end 8B, 8B' of the bar 8 abuts against the head of these screws. The bar 8 is therefore immobilized transversely, at its ends 8B, 8B', via the liners 21, 21' of resin. Moreover, this bar 8 is immobilized axially in two opposite directions, thanks to the head 24, 24' of the screws 22, 22'.

Should it prove necessary to change the bar 8, for example with a view to repairing it, one of the screws which immobilizes it axially, in the present case screw 22' in the example shown in FIG. 4, should be removed. Thanks to the presence of the anti-adhesive varnish, the end 8B' is free to slide axially within the liner 21', in the same way as the opposite end 8B. Being given that the median part 8A of the bar 8 is of smaller section than the ends, it is superfluous to coat it with such an anti-adhesive varnish for the purpose of ensuring its passage through the liner 21'. It should be noted that, during this dismounting operation, the second screw 22 remains engaged in the flange 6.

It is particularly easy to assemble a new bar on its support. The ends thereof should firstly be coated with the anti-adhesive varnish. One of the ends of this bar is then introduced within the liner 21' of which access is not prevented by the presence of a screw. This first end is then made to slide in this liner 21'. The median part is then passed, then the second end of this bar is slid therein. The latter is then positioned precisely in an axial direction, due to the presence of the screw 22 against which the first end of this new bar abuts. Moreover, this latter is perfectly positioned in a transverse direction, due to the presence of the liners of resin 21, 21' having served to immobilize the first bar 8. Securing of the new bar in translation is effected by replacing the screw 22', removed for the purpose of dismounting the first bar 8, in its original site.

Thanks to this embodiment, it is not necessary either to destroy the sealing resin or to use the particular tool having served to position and secure the first bar 8.

Figure 5:
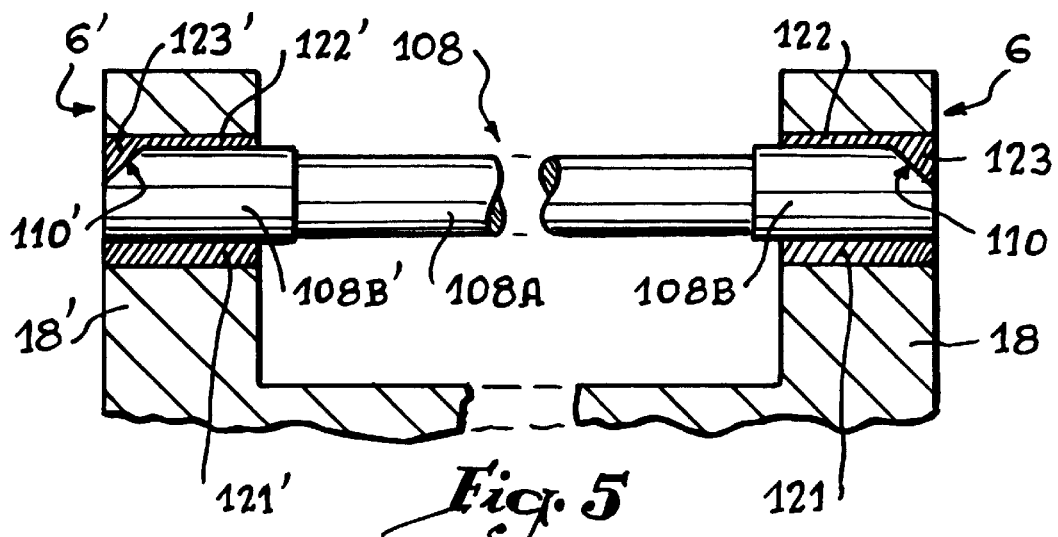
FIGS. 5 to 7 are views similar to FIGS. 3 and 4, illustrating a second variant embodiment of the invention, in three phases of assembly of a guiding member.
Figure 6:
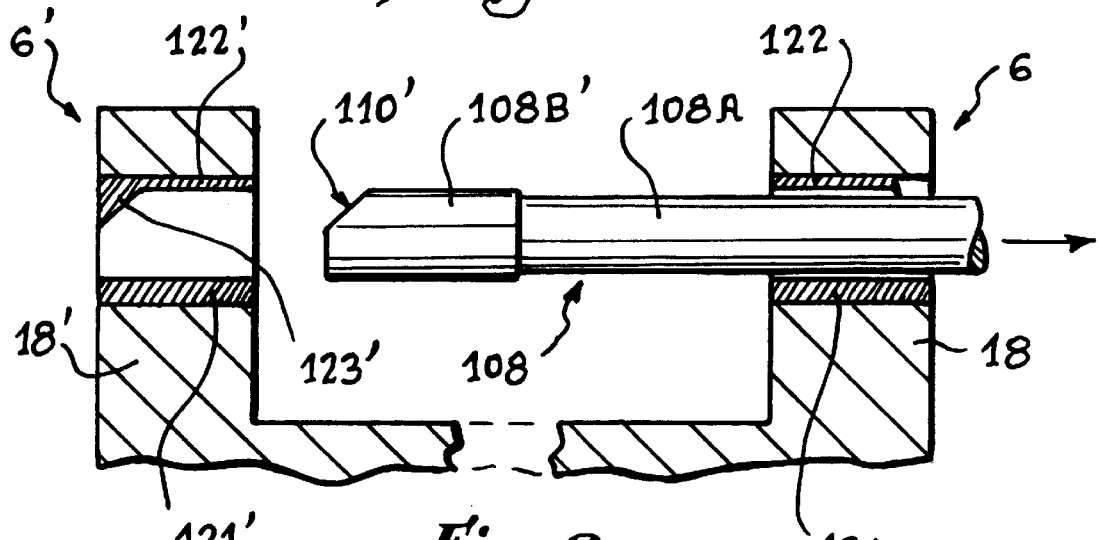
Figure 7:
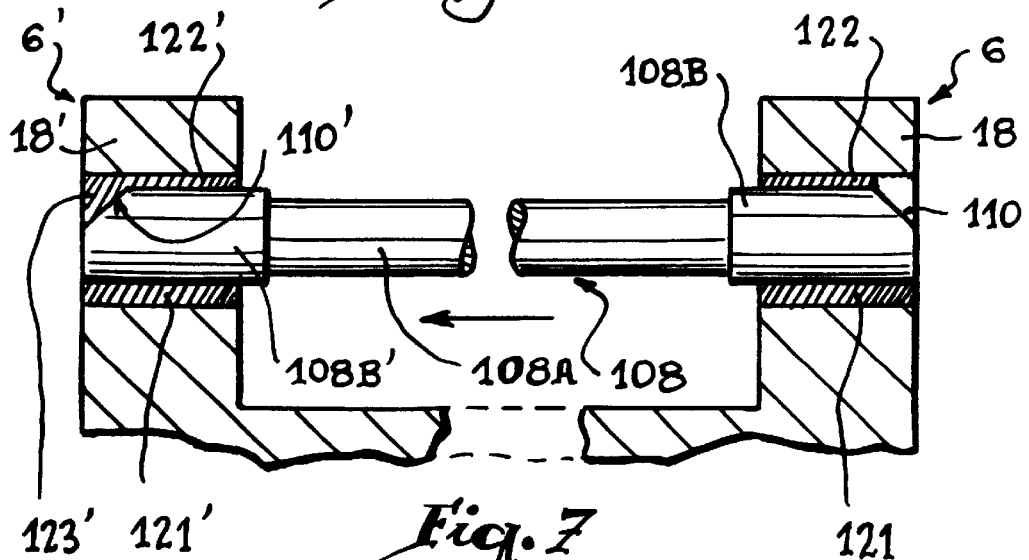

FIGS. 5 to 7 illustrate a second variant embodiment of the invention. According to this variant, the bar 108 differs from that, 8, shown in FIGS. 2 to 4, in that each of its ends 108B, 108B' is provided with a distal bevel or shoulder 110, 110', with the result that they widen towards the median part 108A. The liners of resin, inserted between the walls of the openings 16, 16' and the outer periphery of the ends 108B, 108B' of the bar, with a view to securing the latter with respect to the carriage 6, are therefore no longer overall annular as was the case hereinbefore. These liners 121, 121' comprise an annular part 122, 122' extending in the vicinity of the cylindrical walls of each opening 16, 16', as well as a pocket 123, 123' located in the vicinity of each bevel 110, 110'. Although the ends 108B, 108B' of the bar 108 are coated with an anti-adhesive varnish, this bar is perfectly immobilized both transversely, thanks to the annular parts 122, 122' of the liners of resin, and axially, since these ends come into abutment against the pockets 123, 123' which hinder the displacement of the bar.

If it is desired to dismantle this bar 108, for example with a view to repairing it, it is necessary to break one of the pockets of resin, in the present case pocket 123 as shown in FIG. 6. The corresponding end 108B of the bar 108 is then free to slide axially within the annular part 122 of the liner 121, due to the presence of the anti-adhesive varnish. The median part 108A of smaller section is then passed through this annular part 122, then the second end 108B' is finally slid therein.

The operation consisting in mounting a new bar on the flange 6 is effected in similar manner, by introducing this new bar from the opening 16 which is free of a pocket of resin 123. The end of this new bar, previously introduced through this opening 16, then comes into abutment against the non-destroyed pocket 123', as shown in FIG. 7.

Thanks to the invention, the positioning imparted to this new bar is given the same degree of precision as that of the first bar 108. In effect, each end of the new bar is positioned in a transverse direction, thanks to the presence of the annular parts 122, 122' within which the ends are introduced. Moreover, the axial positioning of the whole of the new bar is ensured by the pocket 123' which was not destroyed during dismounting of the first bar, against which pocket the new bar abuts.

This new bar is secured in translation by casting a new pocket of resin in the site 124 of the cavity 123 previously destroyed.

It may be considered that the pocket of resin 123 disposed within this site 124 constitutes a removable axial fixing means, since it can be replaced very simply. Moreover, when it is removed, the transverse positioning of the bar 8 with respect to the openings 16, 16' is not altered.

Figure 8:
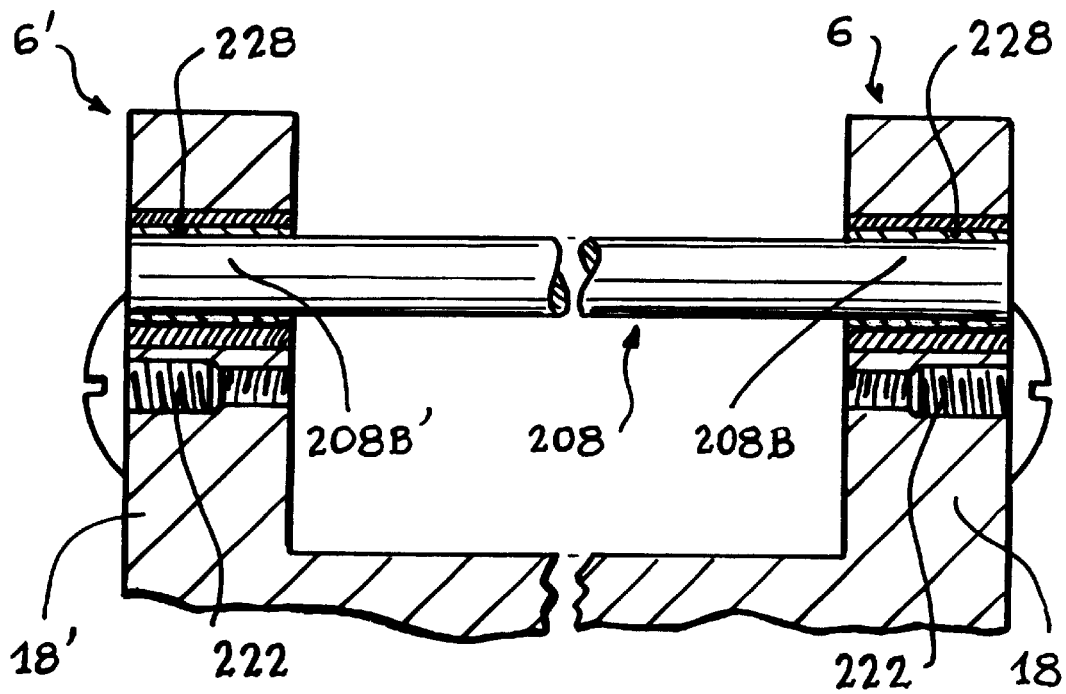
FIGS. 8 and 9 are views similar to FIGS. 3 to 7, illustrating two additional variant embodiments of the invention.
Figure 9:
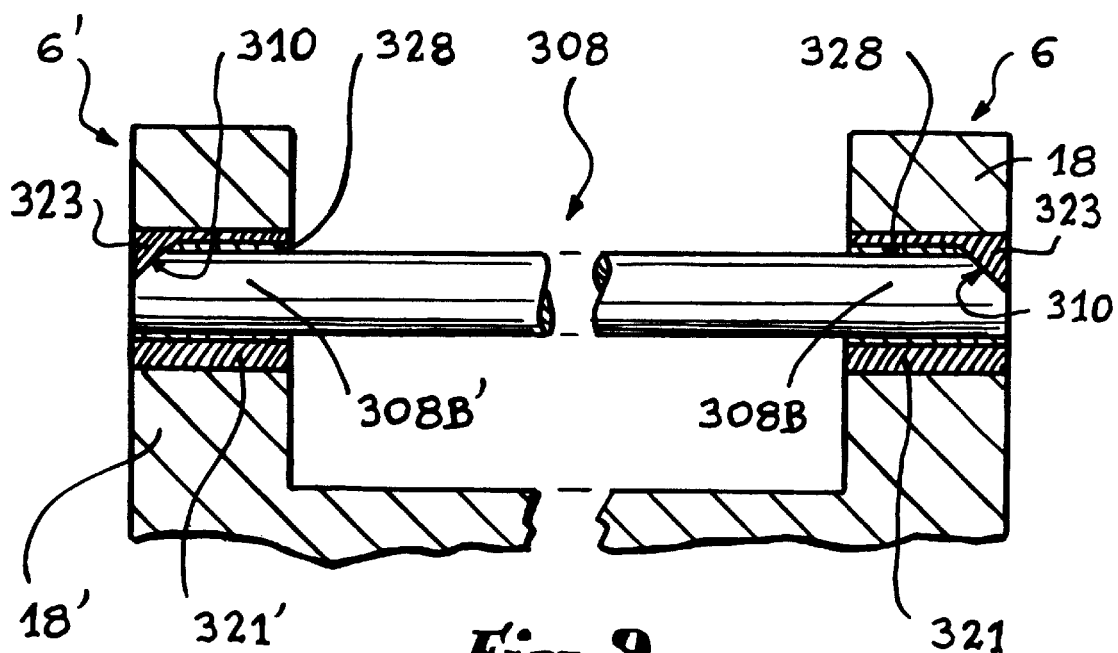

FIGS. 8 and 9 illustrate two additional variant embodiments of the invention. In FIG. 8, the bar 208 presents a constant diameter over the whole of its length. The outer periphery of its ends 208B, 208B' is not coated with an anti-adhesive varnish, but is surrounded by an annular ring 228, for example made of metal.

The bar surrounded by these rings is therefore sealed by the resin, then screws 222 similar to those, 22, of FIGS. 3 and 4, are mounted. After having removed at least one of these screws, the bar 208 may be easily removed from the support 6, by sliding within the ring 228 located on the side where the screw is absent.

In FIG. 9, the bar 308 also has a constant diameter over the whole of its length. Its ends 308B, 308B' comprise a bevel or shoulder 310. The outer periphery of its ends 308B, 308B' is not coated with anti-adhesive varnish, but is surrounded by a bevelled ring 328 of which the profile is conjugate with that of ends 308B, 308B'. The bar 308 is sealed to the support 6, being provided with these rings 328, by casting liners of resin 321, 321' similar to those shown in FIGS. 5 to 7. In order to remove the bar 308, at least one of the pockets 323 of resin is broken and the bar 308 may be easily removed from the support 6, by sliding inside the ring disposed on the side where the pocket is broken.

What is claimed is:

1. A process for fixing a guiding member on a support having at least one opening therein adapted to receive an end of the guiding member, the process including the steps of:
   A. providing at least one opening with a transverse dimension substantially greater than that of the end which is to be received therein;
   B. introducing the end into the at least one opening and thereafter precisely positioning the end within the at least one opening so as to be in a predetermined position with respect to a remote surface and thereby creating an intermediate space between an outer periphery of the end and walls of the at least one opening; and
   C. thereafter, filling the intermediate space with a polymerizable material and polymerizing the material so as to secure the end with respect to the at least one opening.

2. The method of claim 1 including the additional steps of providing the end of the guiding member with a beveled surface and forming a pocket of the polymerizable material with a surface which abuts the beveled surface of the end of the guiding member when the guiding member is secured within the at least one opening.

3. The process of claim 2 including the additional step of removing the pocket of material from the at least one opening and thereafter sliding the guiding member relative to the polymerized material within the at least one opening.

4. The process of claim 3 including the additional step of coating at least the end of the guiding member with another material such that the end is slidable with respect to the polymerized material within the at least one opening.

5. The process of claim 4 including the additional step of providing a mechanical fastener for abutting the end of the guiding member when positioned within the at least one opening.

6. The process of claim 1 including the additional step of mounting a ring about the end of the guiding member prior to introducing the end within the at least one opening.

7. A guiding device for guiding an element relative to a surface, the guiding device comprising, at least one guiding member, at least one support having at least one opening therein of a dimension which is substantially greater than a cross-sectional dimension of an end of the at least one guiding member such that the end is initially laterally adjustably relative to an elongated axis of the guiding member after the end is positioned within the at least one opening, and a cast in situ liner formed of a polymerized material formed in an annular space defined between the end of the at least one guide member and the at least one opening in the at least one support so that the end of the at least one guiding member is oriented in a predetermined position within said at least one opening.

8. The guiding device of claim 7 wherein the end of the at least one guiding member is coated with a material which permits the end to slide within the polymerized liner.

9. The guiding device of claim 8 wherein the end of the at least one guiding member includes a beveled surface, and the polymerized liner includes a complimentary beveled surface with is abutted by the beveled surface of the end of the at least one guiding member when the end is positioned within the at least one opening of the at least one support.

10. The guiding device of claim 8 including a mechanical fastener mounted to the at least one support for abutting the end of the at least one guiding member when the at least one guiding member is mounted within the at least one opening to thereby prohibit movement of the at least guiding member in at least one direction relative to an axis of the at least one guiding member.

11. The guiding device of claim 10 including a ring mounted about the end of the at least one guiding member.

12. The guiding device of claim 7 including a ring mounted about the end of the at least one guiding member.

13. The guiding device of claims 7 in which the at least one guiding member has opposite ends, each of the opposite ends being mounted in an opening in spaced support members and each of the opposite ends being mounted in a predetermined positioned within the openings in the spaced support members and being surrounded in situ by a polymerized material liner within the openings.

14. The guiding device of claim 13 in which the opposite ends of the at least one guiding member have a greater cross-sectional diameter than an intermediate portion of the at least one guiding member.

15. The guiding device of claim 13 wherein each of the opposite ends of the at least one guiding member includes a beveled surface, and each of the polymerized liners includes a beveled surface engageable by the beveled surfaces of the opposite ends of the at least one guiding member.

16. The guiding device of claim 13 in which each of the opposite ends are coated with a material which permits the opposite ends to slide within the polymerized liners within the openings of the spaced support members.

17. The guiding device of claim 13 including a ring mounted about each of the opposite ends of the at least one support member.

18. A marking apparatus including a guiding device for supporting a moveable carriage relative to a surface, the marking apparatus comprising, at least one guiding member, at least one support having at least one opening therein of a dimension which is substantially greater than a cross-sectional dimension of an end of the at least guiding member such that the end is initially laterally adjustably relative to an elongated axis of the guiding member after the end is positioned within the at least one opening, and a cast in situ liner formed of a polymerized resin formed in an annular space defined between the end of the at least one guide member and the at least one opening in the at least one support.

\* \* \* \* \*